United States Patent
Elias et al.

(10) Patent No.: US 7,716,459 B2
(45) Date of Patent: May 11, 2010

(54) PROTECTION OF A PROGRAM JUMP FROM FAULT INJECTION BY MASKING A MEMORY ADDRESS WITH A RANDOM NUMBER

(75) Inventors: Pierre Elias, Trets (FR); Pierre-Yvan Liardet, Peynier (FR); Yannick Teglia, Marseilles (FR)

(73) Assignee: STMicroelectronics S.A., Montrouge (FR)

( * ) Notice: Subject to any disclaimer, the term of this patent is extended or adjusted under 35 U.S.C. 154(b) by 0 days.

(21) Appl. No.: 11/126,937

(22) Filed: May 11, 2005

(65) Prior Publication Data

US 2005/0257033 A1 Nov. 17, 2005

(30) Foreign Application Priority Data

May 11, 2004 (FR) .................................. 04 50910

(51) Int. Cl.
*G06F 9/32* (2006.01)
(52) U.S. Cl. ..................................................... 712/234
(58) Field of Classification Search ................. 712/208, 712/216, 220, 226, 228, 234; 713/187, 189, 713/190, 194, 400; 726/22; 380/28
See application file for complete search history.

(56) References Cited

U.S. PATENT DOCUMENTS

| | | | | |
|---|---|---|---|---|
| 5,471,597 | A | * | 11/1995 | Byers et al. .................. 711/215 |
| 6,049,876 | A | * | 4/2000 | Moughanni et al. ........... 726/26 |
| 2002/0029346 | A1 | * | 3/2002 | Pezeshki et al. ............. 713/190 |
| 2003/0101351 | A1 | * | 5/2003 | Liardet ......................... 713/194 |
| 2003/0182572 | A1 | * | 9/2003 | Cowan et al. ................ 713/200 |
| 2005/0259814 | A1 | * | 11/2005 | Gebotys ........................ 380/28 |
| 2009/0254782 | A1 | * | 10/2009 | Bancel et al. .................. 714/53 |

FOREIGN PATENT DOCUMENTS

WO WO 00/42511 * 7/2000

OTHER PUBLICATIONS

"Solving the Software Safety Paradox" Doug Brown, Embedded Systems Programming, vol. 11, No. 13, Dec. 1998.*
"Evaluating processor-behavior and three error-detection mechanisms using physical fault-injection", Miremadi, G. Torin, J. , Reliability, IEEE Transactions on; Publication Date: Sep. 1995; vol. 44, Issue: 3; On pp. 441-454.*
"Injecting bit flip faults by means of a purely software approach: a case studied"; Velazco, R. Corominas, A. Ferreyra, P. ; Defect and Fault Tolerance in VLSI Systems, 2002. DFT 2002. Proceedings. 17th IEEE International Symposium on; Publication Date: 2002; On pp. 108-116.*

(Continued)

*Primary Examiner*—Eddie P Chan
*Assistant Examiner*—Keith Vicary
(74) *Attorney, Agent, or Firm*—Lisa K. Jorgenson; James H. Morris; Wolf, Greenfield & Sacks, P.C.

(57) ABSTRACT

A method for performing at least one jump in a program executed by a processor, including determining a result over several bits as an indicator that a desired condition has been complied with, the result corresponding to an operation taking into account at least one predetermined value and at least one current value; and calculating a jump address which is a function of the result.

29 Claims, 2 Drawing Sheets

OTHER PUBLICATIONS

Messerges (Securing the AES Finalists Against Power Analysis Attacks); Lecture notes in computer science vol. 1978, 2001, pp. 150-164.*

French Search Report from French Patent Application No. 04/50910, filed May 11, 2004.

* cited by examiner

PROTECTION OF A PROGRAM JUMP FROM FAULT INJECTION BY MASKING A MEMORY ADDRESS WITH A RANDOM NUMBER

BACKGROUND OF THE INVENTION

1. Field of the Invention

The present invention generally relates to the implementation of instruction jumps in a program executed by a microprocessor. The present invention more specifically relates to jumps performed by a program implementing secret quantities which are desired to be made undetectable from a possible pirate.

2. Discussion of the Related Art

In most programs or algorithms executed by a microprocessor, conditional jumps, that is, steps during which the program selects the next instruction to be executed from among two different instructions, can be found. Such jumps are generally decided according to the state of a flag or condition bit. According to the state of the flag bit, the program execution carries on with one instruction or the other. At this time, the conditional jump intervenes to direct the program towards a different address.

Such an operation is fully satisfactory in many applications. However, in programs handling secret quantities or more generally implementing algorithms for which it is not desired for an unauthorized user to be able to modify the program sequencing, such jumps form particularly vulnerable points.

In particular, a widespread type of attack to deduce secret quantities from the execution of an algorithm, known as the fault injection attack, consists of forcing a trap in a program by introducing a disturbance (for example, on the processor supply), at strategic program execution positions. Such fault injections then enable discovering the handled secret quantities. For example, and in simplified fashion, if a conditional jump verifies the exactness of a key with respect to a pre-recorded key, the conditional jump to the authorized instructions must not occur if the right key is not introduced in a corresponding variable of the program. By presenting a wrong key and causing disturbances on the program execution (fault injection), a wrong (illicit) conditional jump resulting in the accepting of the wrong key will statistically occur. Now, it is enough for the jump to be authorized once to enable a pirate to exploit the processings performed by the algorithm and thus hack the program.

FIG. 1 very schematically illustrates an execution mode of a conventional jump in a program. Whatever the variables processed at input E, each time a test (block 1, IF) is provided in a program, the next instruction in the program development is different at least in its execution address. For example, if the test is negative (output state 0), the executed instruction often is the next instruction (block 2, NEXT). However, if the test is validated (output state 1), the program executes an instruction (block 3, JUMP) at another address @ in the program or in a sub-program. The two outputs may condition jumps on different addresses.

To protect the program execution against fault injections, two techniques are conventionally used.

FIG. 2 very schematically illustrates, in the form of blocks, a first technique for protecting the execution of a program against fault injections. This techniques consists of performing two executions (block 10, EXEC 1 and block 11, EXEC 2) of the same program in parallel, or shifted in time, and of comparing (BLOCK 12, COMP), the results provided by each of the executions to validate the correct execution of the program. Comparator 12, for example, provides a state bit VALID indicating that the results of the two executions are identical, thus validating the program execution with no fault injection. The used result indifferently is that of one or the other of the executions (for example, that of block 10).

A disadvantage of this technique is either that it requires two hardware program execution cells in the case of a parallel execution, or that it takes time since the program must be executed twice before a valid result can be taken into account.

A second known technique consists of calculating signatures of two executions in parallel of the same program for, here again, comparing the signatures with a pre-recorded signature or with each other. As in the case of FIG. 2, this requires two executions and thus two hardware cells, or twice as much time. Further, the integrated circuit executing the program must have the functions enabling calculation of such signatures.

An additional disadvantage of the two above-described conventional techniques is that they only enable a detection a posteriori.

A technical problem is that a program must have a reproducible execution, that is, that it must develop correctly in the absence of a piracy attempt. In other words, this technical problem is linked to the fact that the program and especially the conditional jumps must be provided in advance for a given operation of the program, which makes it sensitive to fault injection attacks.

Document WO-A-00/42511 discloses a jump system in a program, in which a jump address is a function of a test result taking into account a base address and a variable. This document aims at avoiding attacks based on power analysis of the integrated circuit executing the program. Such a solution is ineffective against fault injection attacks to which relates the present invention.

SUMMARY OF THE INVENTION

The present invention aims at overcoming the disadvantages of known techniques to avoid program traps.

The present invention in particular aims at reducing the vulnerability of a jump in a program.

The present invention further aims at providing a solution which is compatible with the need for reproducibility of a program execution.

More generally, the present invention aims at providing a novel technique for performing a conditional jump in a program executed by a processor.

To achieve these and other objects, the present invention provides a method for performing at least one jump in a program executed by a processor, comprising:

determining a result over several bits as an indicator that a desired condition has been complied with, the result corresponding to an operation taking into account at least one predetermined value and at least one current value; and calculating a jump address which is a function of the result.

According to an embodiment of the present invention, trap instructions are placed at the respective addresses to which the jump leads in the case where the variable does not comply with the expected condition.

According to an embodiment of the present invention, the result is a function of a random number drawn at each beginning of a program execution, an address conversion table being stored at each instruction beginning.

According to an embodiment of the present invention, a same result is used for different conditional jumps of a same program, each authorized conditional jump corresponding to a different result.

The present invention also provides a method for reducing the vulnerability of at least one jump in a program.

The present invention also provides an integrated program execution processor, comprising address calculation means.

The foregoing objects, features, and advantages of the present invention, as well as others, will be discussed in detail in the following non-limiting description of specific embodiments in connection with the accompanying drawings.

DETAILED DESCRIPTION

Figure 1:
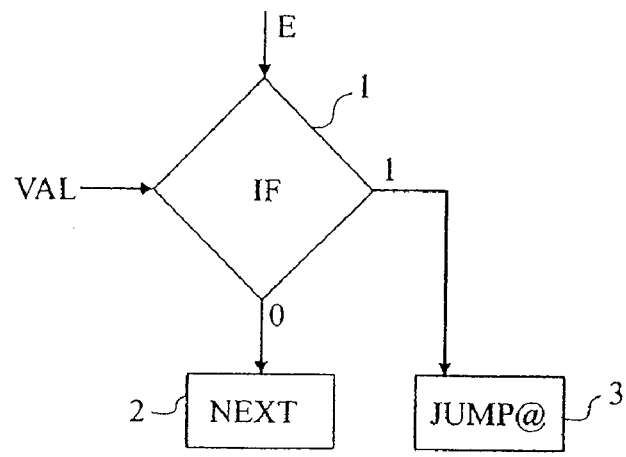
FIGS. 1 and 2, previously described, are intended to show the state of the art and the problem to solve.
Figure 2:
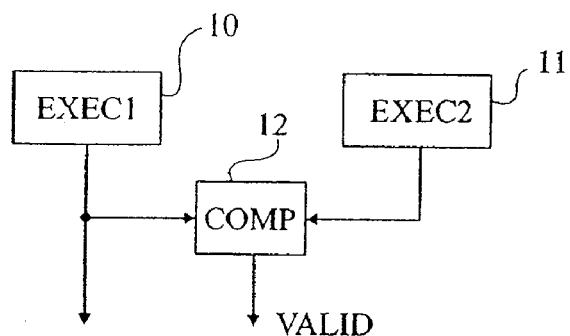

The same elements have been designated with the same references in the different drawings. For clarity, only those elements necessary to the understanding of the present invention have been shown in the drawings and will be described hereafter. In particular, the data conditioning the jump(s) to be executed have not been detailed, the present invention being compatible with any type of jump and condition data.

Figure 3:
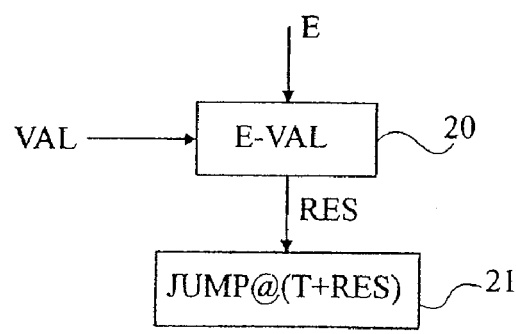
FIG. 3 very schematically illustrates in the form of blocks an embodiment of the method according to the present invention.

FIG. 3 shows, in simplified blocks, the steps of a jump according to a first embodiment of the present invention.

As previously, it is desired to perform a jump based on a comparison of two data, that is, an input datum E and a reference value VAL (threshold, other program execution data, etc.).

According to the present invention, instead of comparing these two data to provide a binary result, a result RES of a mathematical operation on data E and VAL is calculated. In the simplified example of FIG. 3, it is assumed that this operation is a subtraction (block 20, E-VAL). Accordingly, datum RES here is equal to E-VAL. It should however be noted that any mathematical operation may be used, provided to provide a result over several bits. The present invention thus replaces the conditional jump with an absolute jump.

Value RES is used, according to the present invention, as an increment for a jump instruction (block 21, JUMP @(T+RES)). The greater the number of coding bits of result RES, the more the probability of jumping by chance to the right place is decreased.

To implement the present invention, the memory in which are stored the instructions to be executed should be organized in specific fashion.

Figure 4:
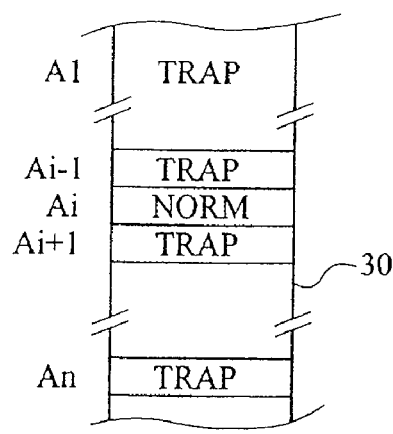
FIG. 4 illustrates the trend of the content of an memory addressable according to the embodiment of FIG. 3.

FIG. 4 very schematically illustrates an organization mode of such a memory 30.

An address $A_i$ corresponds to the address calculated with a valid result RES ($A_i$=T+RES). The jump executed by the program then leads to a normal instruction or instruction group NORM.

According to a first embodiment, all the other addresses across which the jump instruction comes if result RES is not valid (addresses $A_1, \ldots A_{i-1}, A_{i+1}, \ldots, A_n$) lead to trap instructions TRAP. Such instructions may consist of infinite loops, of direct program exits, of destructions of the element or any other blocking instruction currently used in programs handling secret data. For example, the method described in US patent application N° 2003-0101351, which is incorporated herein by reference, may be used.

Of course, to each address A generally corresponds not a single instruction, but a group of instructions ending either by another jump, or by a return to the instruction (block 21, FIG. 3) following in the program code that having called the execution thereof.

Thus, upon writing of the program in which the jumps are desired to be made impossible to be modified by the implementation of the present invention, the instructions are positioned in specific fashion according to the results expected for the address calculation. Providing such an organization of the program poses no specific difficulty and is within the abilities of those skilled in the art.

An advantage of the present invention is that, if a pirate attempts to force the program execution by fault injection attacks, the probability for him to come across the correct result RES is considerably decreased since it forms a word over several bits.

At first sight, the implementation of the present invention seems to complicate the execution of a jump. Indeed, the execution time of a conventional conditional jump conditioned by a single bit is shorter than the address calculation execution time required by the present invention. However, the advantages provided by the present invention especially by considerably decreasing the vulnerability of the jump (its putting at fault) widely compensates for this additional operation time.

Several jump instructions 21 provided by the present invention may be arranged at different locations of the program, even if each one only leads to a single valid result. To achieve this, base address T is the address from which are arranged all the processings (and especially the traps) of the considered jump while shift RES leads to the valid address.

Instead of a simple addition as provided in the simplified example of FIG. 3, more complex operations can be implemented in the jump address calculation.

According to another embodiment of the present invention, result value RES is likely to lead to several valid jumps. In this case, base address T of the used jump instruction conditions the effective jump in one category or another according to the state of word RES.

To give a very simplified example of such an embodiment, assume a word RES over two bits and a base address T over a single bit, a full address being over three bits. Assume that, for a first function, the valid value RES is 10 while for the second function, the valid value RES is 01. It can be seen that this amounts to considering that each of the bits corresponds to a flag. Assume that for the first function, base address T is 0 while for the second function, it is 1. In such a case, the valid addresses in the memory respectively are 010 and 101. The other six available addresses may contain trap functions or other valid functions if the result calculation (block 20, FIG. 3) does not risk leading thereto.

The above example has been extremely simplified and is completely arbitrary. In practice, the addresses are over much larger numbers of bits. For example, addresses over 32 bits with 16-bits results may be provided, thus enabling a greater number of different jumps from a same result word.

Such an embodiment enables, in a way, managing several jump flags in parallel. This enables decreasing the time lost by the address calculation with respect to conventional direct jumps.

Figure 5:
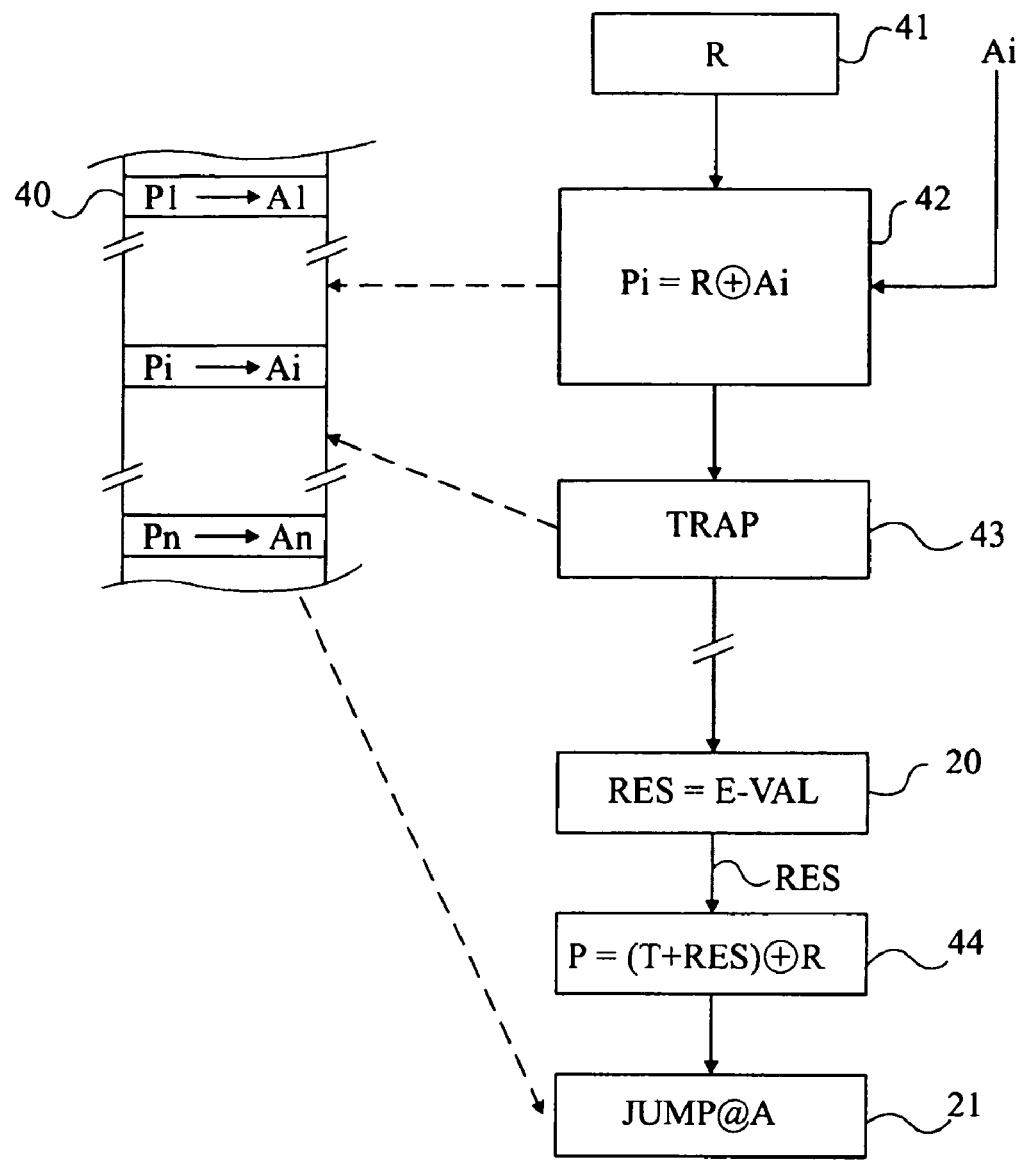
FIG. 5 illustrates a second embodiment of the present invention.

FIG. 5 very schematically illustrates in the form of blocks a second embodiment of the present invention according to which result value RES depends on a random number.

According to this embodiment, at each beginning of a program execution, an address table 40 which is stored in the memory associated with the processor executing the program is calculated. As an alternative, the table is created dynamically upon execution of the program and may be crushed (replaced) once it is no longer useful for the jump for which it has been created.

The address table is obtained by combining, by an XOR-type function, valid address $A_i$ with a random number R (block 41, R). The result of this calculation (block 42, $P_i = R \oplus A_i$) provides an address masked by random number R. Notation $\oplus$ designates the XOR combination, which amounts to a bit-to-bit addition. Masked address $P_i$ is stored in table 40. Similarly, trap instructions (block 43, TRAP) provided to be stored at the other addresses $A_1, \ldots, A_{i-1}, A_{i+1}, \ldots, A_n$ of memory 30 (FIG. 4) are combined with random number R and the corresponding results $P_1, \ldots, P_{i-1}, P_{i+1}, \ldots P_n$ are stored in table 40.

Afterwards, on execution of the program, address calculation 20, which is a function of reference value VAL and of current value E, is performed as previously.

However, the next step (block 44, $P=(T+RES) \oplus R$) consists of masking address T+RES by the memorized random number R, to obtain a masked address P. Address P is used to fetch the corresponding address A from table 40. After, the jump (block 21, JUMP) is performed at address A extracted from table 40.

This embodiment has been discussed in relation with a single valid address $A_i$. Of course, as with the other embodiment, it is possible to provide several valid operations.

An advantage of masking the address calculation with a random number drawn at each execution is that no repeatable means can be found to have access to a valid function from one execution to the other of the program. Indeed, even if a possible pirate comes across a valid function in an execution, the result of the address calculation at the next execution will lead to another address.

Of course, the present invention is likely to have various alterations, modifications, and improvements which will readily occur to those skilled in the art. In particular, the respective sizes in number of bits of the variables used by the present invention in the address calculation depends on the application and is within the abilities of those skilled in the art based on the functional indications given hereabove. Further, the practical implementation of the present invention by programming is within the abilities of those skilled in the art by using conventional programming instructions.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

Furthermore, the choice between blocking the program immediately or with delay after a jump to a trap instruction, and the implementation of a permanent or temporary blocking depend on the application.

What is claimed is:

1. A method for protecting at least one jump in a program executed by a processor from attack, the method comprising:
   determining a result over several bits as an indicator of whether the attack is underway, the result corresponding to an operation taking into account at least one fixed value and at least one current value;
   determining a masked memory address based on the result, a random number, and a base address;
   deriving a jump address using the masked memory address; and
   performing a jump operation to execute instructions stored at the jump address,
   wherein
   the jump address is within a first plurality of memory addresses,
   the first plurality of memory addresses storing at least one first trap instruction, at least one second trap instruction, and at least one normal instruction such that the at least one normal instruction is stored at a memory address between the at least one first trap instruction and the at least one second trap instruction, and
   an instruction stored at the jump address is the at least one normal instruction if the attack is not underway and is the at least one first or second trap instruction if the attack is underway.

2. The method of claim 1, wherein the program is delayed by a jump to an address containing a trap instruction.

3. The method of claim 1, wherein the random number is drawn at each beginning of a program execution, and
   wherein an address conversion table is stored at each program beginning, the address conversion table storing at least one potential jump address at each memory address of the address conversion table.

4. The method of claim 1, wherein a same result is used for different conditional jumps of a same program, each conditional jump corresponding to a different base address.

5. The method of claim 1, wherein a vulnerability of at least one jump in a program is reduced.

6. The method of claim 1, wherein the attack is a fault injection attack.

7. The method of claim 6, wherein the fault injection attack comprises disturbing a power supply of the processor.

8. The method of claim 1, wherein deriving the jump address comprises using the masked memory address to fetch the jump address from memory.

9. The method of claim 8, wherein using the masked memory address to fetch the jump address from memory comprises retrieving the jump address from memory using the masked memory address.

10. A method comprising:
    determining a masked memory address based on a random value, at least one fixed value, at least one variable value, and a base address;
    deriving a jump address using the masked memory address;
    performing a jump operation to execute instructions stored at the jump address; and
    executing instructions stored at the jump address,
    wherein
    the jump address is within a first plurality of memory addresses,
    the first plurality of memory addresses storing at least one first trap instruction, at least one second trap instruction, and at least one normal instruction such that the at least one normal instruction is stored at a memory address between the at least one first trap instruction and the at least one second trap instruction, and an instruction stored at the jump address is the at least one normal instruction if an attack is not underway and is the at least one first or second trap instruction if the attack is underway.

11. The method of claim 10, wherein the jump address is a function of a random value drawn when a program containing the jump instruction begins execution.

12. The method of claim 11, wherein an address of the first plurality of memory addresses is jumped to based on the random value.

13. The method of claim 10, wherein multiple sets of normal instructions may be stored each at a memory address within the first plurality of memory addresses.

14. The method of claim 10, wherein the trap instructions may comprise at least one of infinite loops, direct program exits, and destruction of data.

15. The method of claim 10, wherein the jump address is a word.

16. The method of claim 10, wherein the attack is a fault injection attack.

17. The method of claim 16, wherein the fault injection attack comprises disturbing a power supply of a processor carrying out the method.

18. The method of claim 10, wherein deriving the jump address comprises using the masked memory address to fetch the jump address from memory.

19. The method of claim 18, wherein using the masked memory address to fetch the jump address from memory comprises retrieving the jump address from memory using the masked memory address.

20. An apparatus comprising:
a processor configured to:
determine a masked memory address based on a random value, at least one fixed value, at least one variable value, and a base address,
derive a jump address using the masked memory address,
perform a jump operation to execute instructions stored at the jump address, and
execute instructions stored at the jump address; and
at least one computer-readable medium configured to store normal instructions and trap instructions to be executed by the processor,
wherein
the jump address is within a first plurality of memory addresses,
the at least one computer-readable medium stores at least one first trap instruction, at least one second trap instruction, and at least one normal instruction such that the at least one normal instruction is stored at a memory address between the at least one first trap instruction and the at least one second trap instruction, and
an instruction stored at the jump address is the at least one normal instruction if an attack is not underway and is the at least one first or second trap instruction if the attack is underway.

21. The apparatus of claim 20, wherein the jump address is a function of a random value drawn when a program containing the jump instruction begins execution.

22. The apparatus of claim 21, wherein an address of the first plurality of memory addresses is jumped to based on the random value.

23. The apparatus of claim 20, wherein multiple sets of normal instructions may be stored each at a memory address within the first plurality of memory addresses.

24. The apparatus of claim 20, wherein the trap instructions may comprise at least one of infinite loops, direct program exits, and destruction of data.

25. The apparatus of claim 20, wherein the jump address is a word.

26. The apparatus of claim 20, wherein the attack is a fault injection attack.

27. The apparatus of claim 26, wherein the fault injection attack comprises disturbing a power supply of the processor.

28. The apparatus of claim 20, wherein the processor is adapted to derive the jump address by using the masked memory address to fetch the jump address from the at least one computer-readable medium.

29. The apparatus of claim 28, wherein the processor is adapted to use the masked memory address to fetch the jump address from memory by retrieving the jump address from the at least one computer-readable medium using the masked memory address.

* * * * *